Dec. 15, 1964 J. O. McCARTY ETAL 3,161,729
TEMPERATURE ANNOUNCING MACHINE
Filed Oct. 9, 1959 4 Sheets-Sheet 1
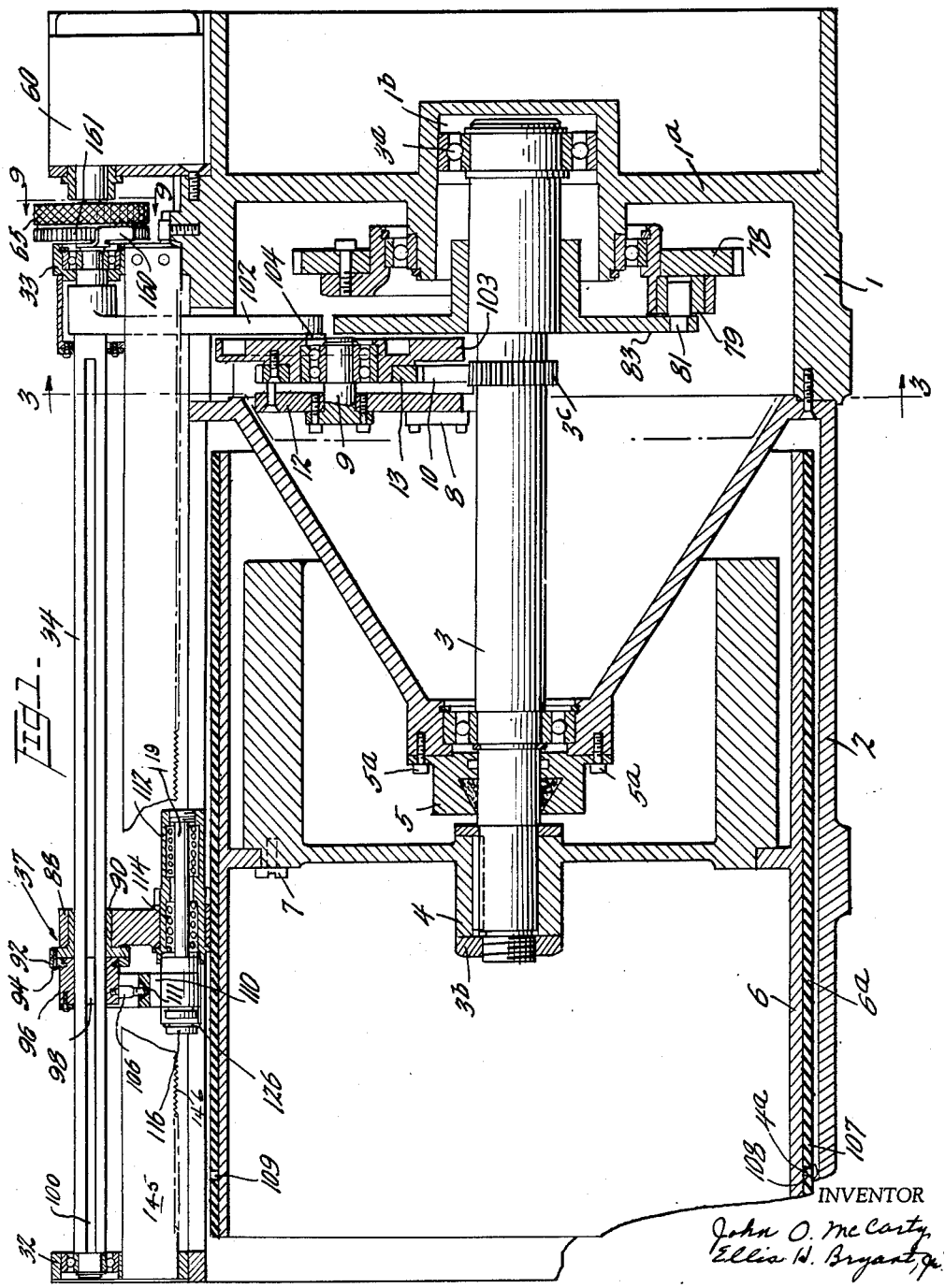
INVENTOR
John O. McCarty,
Ellis H. Bryant, Jr.
BY Watson, Cole, Grindle & Watson
ATTORNEYS

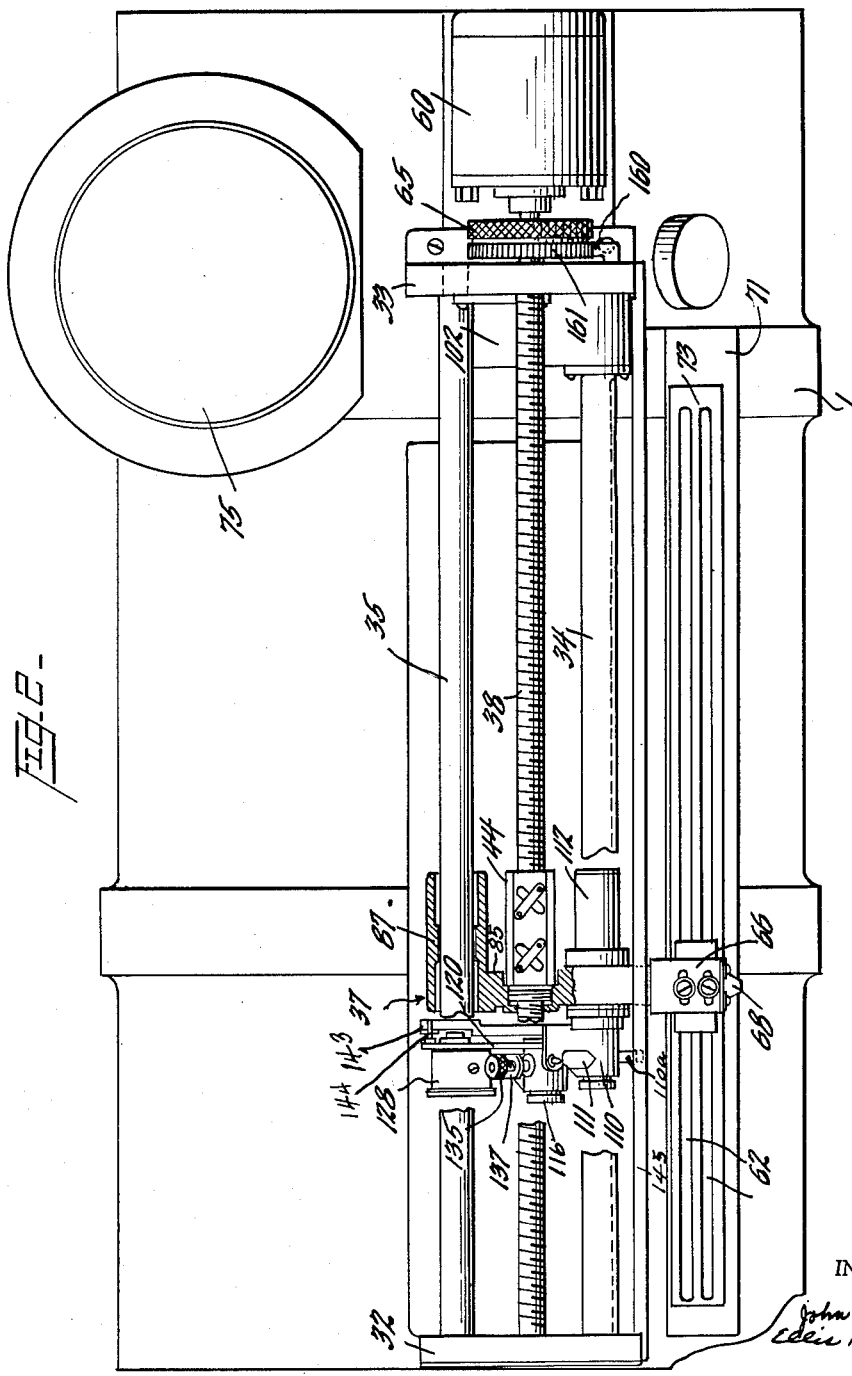

Dec. 15, 1964    J. O. McCARTY ETAL    3,161,729
TEMPERATURE ANNOUNCING MACHINE
Filed Oct. 9, 1959    4 Sheets-Sheet 3
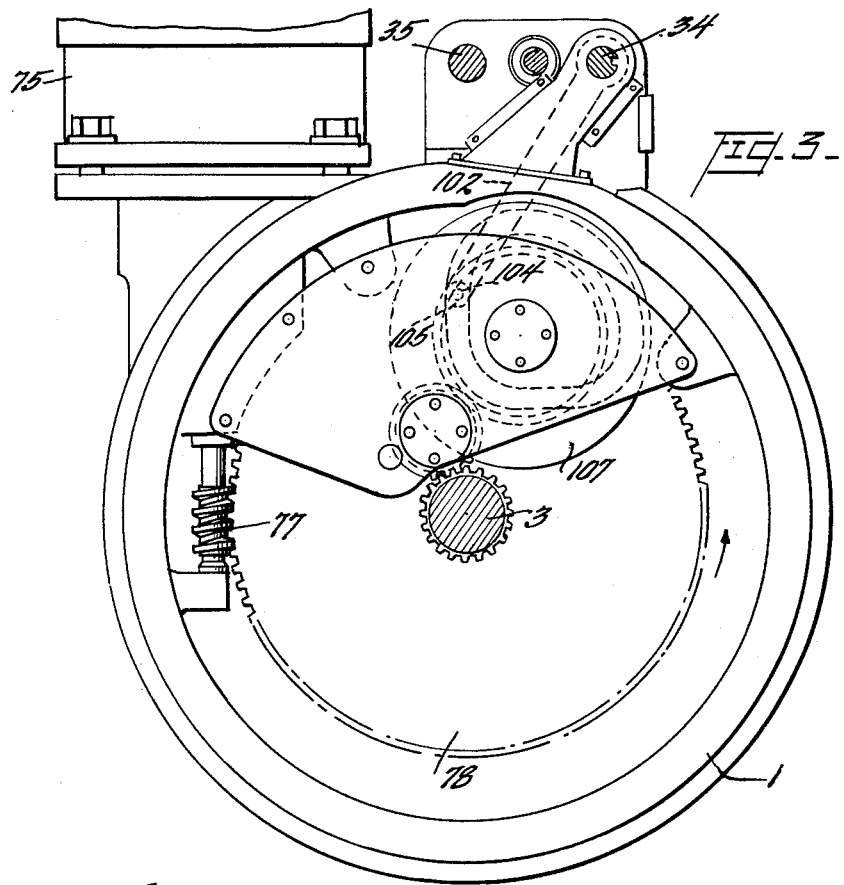
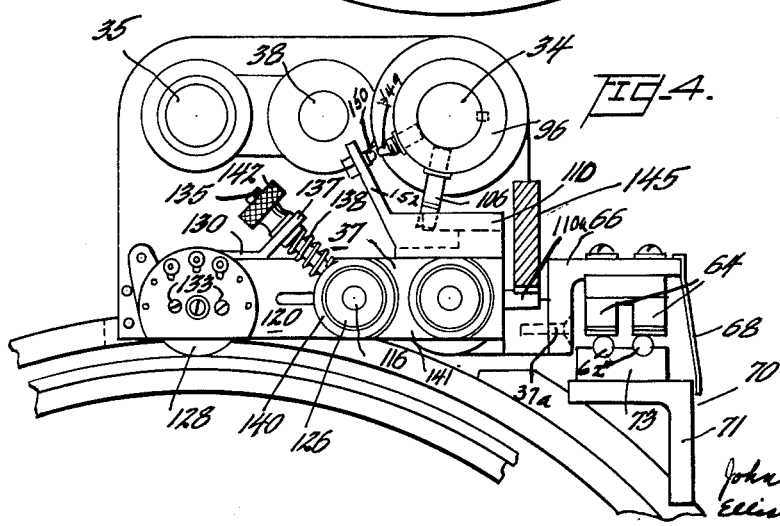
INVENTOR
John O. McCarty
Ellis H. Bryant, Jr.
BY Watson, Cole, Grindle & Watson
ATTORNEYS Dec. 15, 1964  J. O. McCARTY ETAL  3,161,729
TEMPERATURE ANNOUNCING MACHINE
Filed Oct. 9, 1959  4 Sheets-Sheet 4
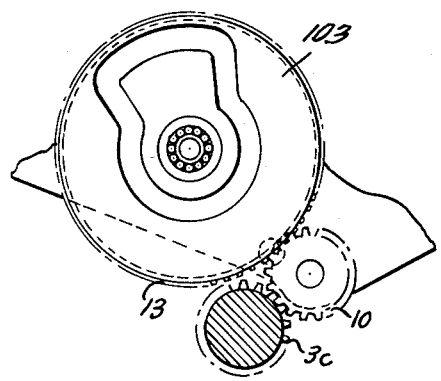
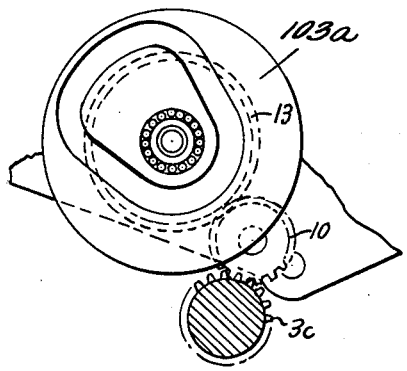
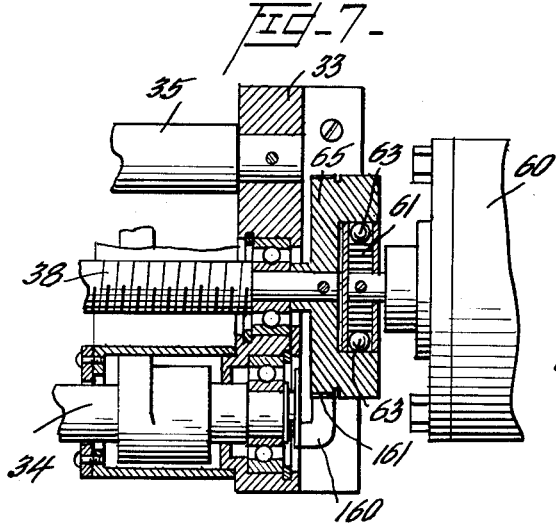
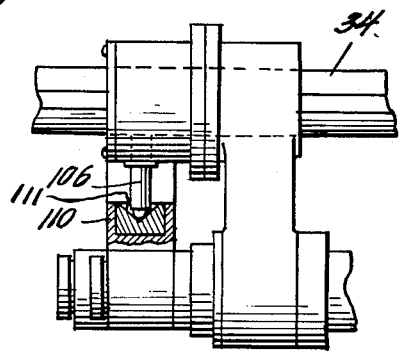
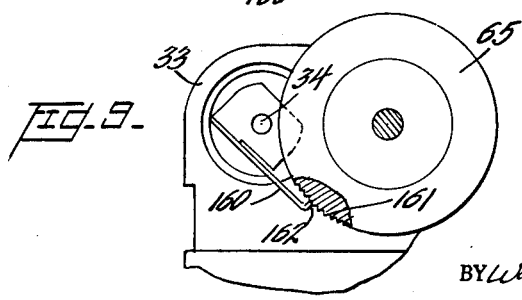
INVENTOR
John O. McCarty,
Ellis H. Bryant, Jr.
BY Watson, Cole, Grindle & Watson
ATTORNEYS 3,161,729
TEMPERATURE ANNOUNCING MACHINE
John O. McCarty and Ellis H. Bryant, Jr., Atlanta, Ga., assignors to The Audichron Company, Atlanta, Ga., a proprietorship
Filed Oct. 9, 1959, Ser. No. 845,392
12 Claims. (Cl. 179—100.2)

This invention relates to announcing machines and more particularly to magnetic drum type announcing machines for announcing physical variables.

Priorly, numerous types of announcing machines have been employed to deliver a recorded signal indicative of a physical variable. However, few of these machines are capable of continuous operation for a sustained period of time, for example, several years, while delivering an accurate reading in a trouble-free manner.

Also, priorly, magnetic drum type reproducing devices have been employed to announce physical variables of a periodic nature. For example, see Franklin Patent No. 2,285,425, issued June 9, 1942, for an Announcing Machine and System. It is to be noted, however, that the problems relevant to machines for announcing a physical variable of the aperiodic type, such as temperature, are entirely distinct from those relevant to machines for announcing periodic variables, such as time.

In the periodic type machine, the machine must move the reproducing instrument, such as the magnetic head, in equal steps, which steps are always in a predetermined cyclic direction. For example, the head moves axially with respect to the drum from one end to the other and when it reaches the other end, the head movement mechanism is reversed and the head is driven to the one end. In the aperiodic type machine, however, the head must be moved through infinitely variable steps in either direction. Further, movement of the reproducing head must be controlled with such a high degree of accuracy that one and only one record will be produced. For example, in the instance of a temperature announcer, provision must be made for accurately positioning the head with respect to one of the record "tracks" even though the actual temperature is between that recorded on two adjacent tracks. If the adjacent tracks are records of succesive degrees of temperature, provision must be made for positioning the reproducing instrument, such as the magnetic head, in a co-operative position with one of these tracks even though the temperature is one-fourth or, under the most disadvantageous conditions, half way between the temperature recorded on the respective tracks. Further, the solution of this problem must be such that "locking" of the relative movement between the reproducing head and the record supporting device can never occur.

Accordingly, it is an object of this invention to provide an improved announcing machine.

It is another object of this invention to provide an announcing machine which reports the magnitude of an aperiodic physical variable with a high order of accuracy.

It is another object of this invention to provide an announcing machine which will operate over a long period of time in a substantially trouble-free manner.

It is another object of this invention to provide a magnetic drum announcing machine for announcing an aperiodic physical variable in a very reliable manner.

It is another object of this invention to provide a magnetic drum type machine for announcing an aperiodic bi-directional variable in a very reliable manner, which machine represents a simple and economic solution of the above-mentioned problems.

Briefly, in accordance with aspects of this invention, a magnetic drum type announcing machine is provided with magnetic head carriage mechanism which is operatively coupled to an aperiodic variable responsive servosystem. This servosystem, which may be of the Wheatstone bridge type, accurately laterally positions the magnetic head supporting carriage with respect to the magnetic drum as the servosystem rebalances itself in response to bilateral changes in the aperiodic variable. Advantageously, the magnetic announcing tracks are recorded in individual planes perpendicular to the axis of the magnetic drum. The carriage mechanism includes a first and a second guide bar. One of the guide bars also serves the purpose of actuating a pivot arm to move the magnetic head in a plane vertical to the axis of the drum. Advantageously, this pivot arm or pivot pin is secured to a lifter sleeve, which sleeve is slidably mounted on and rotatable with the guide bar. The pivot pin acts as a rotating arm to engage a V-shaped slot on the magnetic head arm carrier. The engagement between the pivot pin and the V-shaped slot on the magnetic head arm carrier performs two functions. First, the magnetic head is pivoted out of operative engagement with the magnetic drum. Second, the magnetic head is accurately transversely positioned at the precise point at which an electrical balance, indicative of the exact temperature, is achieved in the servosystem. Also, advantageously, a detent bar is secured in a position parallel to the guide bars and adjacent the head arm carrier. A miniature ball bearing is secured to the head arm carrier and this bearing engages one of the detents in the detent bar when the head arm carrier is rotated to a position in which the magnetic head operatively engages the magnetic drum. Advantageously, each of the detents on the detent bar is aligned with one of the tracks on the magnetic drum.

In accordance with other aspects of this invention, the head arm carrier is slidably mounted on the head arm carriage in a manner to permit limited sliding movement with respect to the carriage in a direction parallel to the axis of the magnetic drum. When the magnetic head is moved into co-operative relationship with the drum by the lifter actuator, the ball bearing on the head arm carrier engages one of the detents in the detent bar and causes the head arm carrier to slide a slight distance corresponding to the distance between the null balance position of the servomechanism and the nearer temperature announcing track so that tht head is aligned with the track which corresponds to the nearer temperature.

In accordance with still other aspects of this invention, a null actuating pin is connected to the lifter actuator pin and this null actuating pin co-operates with a null actuator driven pin mounted on the head arm carrier to prevent the occurrence of locking between the knife edge detent bearing arm and the detents in the detent bar. For example, if the temperature to be announced was exactly one-half a degree and the ball bearing moved into engagement with the tip of one of the points on the detent bar, it is possible that the ball bearing and the point of the detent bar would balance in this position and prevent the movement of the magnetic head into co-operative engagement with the magnetic drum. Thus, the machine would deliver no announcement at all. However, by the use of the null actuating pin and the null actuator driven pin, such locking can never occur.

In accordance with still other aspects of this invention, a clutch is provided between the motor of the servosystem and the carriage mechanism for the magnetic head. In any servomechanism in which precise measure must be obtained, it is necessary that there be a high gear ratio between the driving motor and the driven balance element. The coupling between this motor and the driving mechanism is advantageously an overload type of clutch. This clutch provides a coupling between the motor and the worm shaft, which coupling prevents damage to the carrier mechanism and to the motor in the event that the carriage mechanism becomes locked at one of the end points. Advantageously, the overload clutch is provided with a knurled cap to permit manual positioning of the head carriage. By rotation of the knurled cap, the carriage is positioned. However, such rotation will not cause movement of the motor armature which is connected in the servosystem. Further, this clutch provides a means for quick calibration of the servomechanism. Also, this clutch mechanism may be employed to move the carriage off its balance point to determine if the servomechanism rebalances. Elongated resistance members are mounted parallel to the axis of magnetic drum and these resistance elements are connected in the servosystem. A contact member is mounted on the magnetic arm supporting carriage and this contact member slidably contacts the resistance elements. The servosystem is of the well known Wheatstone bridge type and when the servomechanism is balanced, the magnetic head is positioned adjacent the record track which more nearly corresponds to the correct temperature.

In one illustrative embodiment of this invention, a temperature announcing machine is operated in combination with a time announcing machine. Synchronous motors are connected to the two magnetic drums and these synchronous motors are connected to the same source of power. Advantageously, a gear train is connected to the drum shaft gear of the temperature or other aperiodic variable announcing machine, and one of these gears of the gear train has a cam surface thereon. A cam follower member is mounted on an arm and linked to the magnetic head and the cam surface periodically actuates the cam follower to rotate the magnetic head. Accordingly, this cam actuation of the magnetic head periodically moves the magnetic head into and out of engagement with the magnetic drum. In one illustrative embodiment of this invention, the speed of rotation of the cam surface gear is such that each ten seconds the magnetic head rotates through a predetermined angle and dwells for a short period in a position of co-operation with the magnetic drum and then returns to its initial position removed from the magnetic drum. A similar action of engagement and disengagement of the magnetic head of the time announcing machine takes place. However, the periods are so related that the time machine is announcing while the temperature machine head is removed from its drum and vice versa.

In one illustrative embodiment of this invention, the lifter pin is disengaged from the head arm carrier and when the lifter pin is rotated through the predetermined angle, it moves into engagement with a V-shaped notch in the head arm carrier and rotates the head arm carrier to a position in which the magnetic head is disengaged from the magnetic drum. Advantageously, a miniature ball bearing is mounted on the end of the lifter pin and this ball bearing coacts with the V-shaped notch machine in the head arm carrier. The entire head assembly is reciprocally mounted on frictionless ball reciprocating bushing mounting in the head mount capsule. Thus, the entire head mount assembly assumes the lateral position dictated by the position of the lifter actuator, which position is proportional to the correct temperature. The head is now in its position of disengagement with respect to the record drum where it remains for a predetermined period. The axial positon of the head is now precisely indicative of the exact temperature regardless of whether or not it is aligned with one of the recorded temperature tracks, i.e., whether the temperature is a whole degree or a fraction of a degree. However, as the head is lowered into contact with the record drum, the head is aligned with one of the tracks on drum corresponding to the nearer temperature. This alignment is accomplished through action of a detent bearing mounting and its minature ball bearing coacting with the corresponding V-detent in the detent bar.

Accordingly, it is a feature of this invention to provide an aperiodic variable announcing machine with a magnetic head supporting carriage supported on a pair of guide rods, one of which guide rods acts as a pivot member to support a pivot pin, which pivot pin moves into engagement with a magnetic head supporting carriage and rotates the carriage to move the magnetic head from a position of co-operation with the magnetic drum. As the lifter pin rotates the magnetic head out of co-operation with the magnetic drum, the lifter pin accurately positions the magnetic head to a position proportional to the exact temperature.

It is another feature of this invention to provide an aperiodic type announcing machine with a detent bar which is positioned parallel to the axis of the magnetic drum and to position a detent bearing mounting stud on the magnetic head supporting assembly, which stud engages the detent bar. The magnetic head supporting carriage is accurately positioned with respect to the nearer magnetic drum track corresponding to the nearer temperature.

It is another feature of this invention to provide a magnetic drum type announcing machine with a magnetic head supporting carriage connected through a ball reciprocating bushing to the head arm carrier, which bushing provides for slight, relative lateral sliding between the carriage and carrier. The co-operation of the detent bearing stud and the detent bar laterally move the head supporting member relative to the carriage and thus accurately positions the magnetic head with respect to the nearer magnetic track corresponding to the nearer temperature.

It is another feature of this invention to provide a magnetic drum type announcing machine with a null actuating pin secured to the lifted shaft and a null actuator driven pin secured to the magnetic head arm carrier, which actuating pin and driven pin co-operate to prevent the occurrence of locking during the lateral head positioning operation between the detent bearing stud and the detent bar.

It is another feature of this invention to provide a magnetic drum type announcing machine with a lifter sleeve slidably mounted on a lifter shaft, which lifter shaft acts as a guide bar for the magnetic head carriage mechanism and to provide the lifter sleeve with a lifter pin having a ball bearing on the end thereof such that the ball bearing engages a V-shaped notch in the head arm carrier and when this lifter pin engages the head arm carrier accurately, positions the magnetic head to a position corresponding to the exact temperature.

It is another feature of this invention to connect an overload clutch between a servomechanism controlled motor and the feed screw for the magnetic head supporting carriage, which clutch assembly permits the head carriage to be advanced by rotation of the clutch while unbalancing the motor portion of the servosystem. This clutch provides a means for moving the carriage off balance to see if the servosystem rebalances itself, as well as providing a safety factor between the high torque of the servomotor and the head movement feed screw.

These and various other objects and features of this invention will be more clearly understood from reading a detailed description in conjunction with the drawings, in which:

FIGURE 1 is a front view in elevation, partly in section, of an illustrative embodiment of this invention;

FIGURE 2 is a plan view of FIGURE 1, partly in section, and with certain portions removed;

FIGURE 3 is a side view of FIGURE 1 taken along the lines 3—3 of FIGURE 1;

FIGURE 4 is an enlarged partial end view of FIGURE 1 and particularly the carriage mechanism thereof;

FIGURE 5 is one illustrative embodiment of a cam plate as employed in the embodiment of FIGURES 1 and 2;

FIGURE 6 is another illustrative embodiment of a cam plate which may be employed in the embodiment shown in FIGURES 1–3;

FIGURES 7 and 8 are details of FIGURE 1 to an enlarged scale; and

FIGURE 9 is a side view taken along the lines 9—9 of FIGURE 1 to an enlarged scale.

Referring now to the drawing, and particularly to FIGURES 1-4 thereof, there is depicted one specific illustrative embodiment of a magnetic drum type announcing machine in accordance with this invention. As best seen in FIGURES 1 and 3, a main cylindrical housing 1 supports a record housing 2. Housing 1 has an end-wall 1a, shown in section in FIGURE 1. A main shaft 3 is rotatably supported in housing 1 by means of suitable bearings 3a secured in a recess 1b in wall 1a. The record hub 4 is secured to the record shaft 3 by means of a suitable retaining nut 3b. An oil seal bearing 5 is secured to the conical portion of record housing 2 by means of suitable bolts 5a to prevent the passage of lubricating oil from between wall 1a and record housing 2, out around the record shaft 3. A record drum 6 is mounted on the hub 4 by means of suitable locking screws, such as 7.

A suitable magnetic type rubber belt 6a is positioned on the drum 6 and has a large number of sound tracks. For example, one hundred and forty-three tracks may be recorded on the belt. Advantageously, these record tracks are circumferentially on the record surface in parallel planes, each perpendicular to the axis of drum 6. Each track is separated from its neighboring track by a guard track, which may be approximately 10 mils, to prevent the magnetic head from picking up two tracks at the same time. These tracks may be recorded as follows:

"Temperature below minus 20" . . . "Temperature minus 20,"
"Temperature minus 19," . . . "Temperature zero,"
"Temperature one degree," . . . "Temperature 120 degrees,"
"Temperature above 120 degrees."

A gear train is connected to the record shaft and engages a gear 3c on the record shaft, which gear train includes idler pinion 10, cam plate 103 and cam drive gear 13. This gear train is secured in position by gear train mounting plate 12 held in position by cam mounting stud 9 and idler mounting stud 8. Advantageously, this gear train performs a timing function periodically to control the movement of the magnetic head relative to the magnetic drum in a manner which will be subsequently explained.

Movement and actuation of the magnetic head relative to the drum 6 is achieved by the mechanism on the top of housing 1. This mechanism includes a pair of slide rod mounting brackets 32 and 33 secured to the top of the housing 1. These mounting brackets are best seen in FIGURES 1 and 2 and support a pair of slide rods 34 and 35. A magnetic head supporting carriage 37 slidably engages slide rods 34 and 35. As best shown in FIGURE 2, a feed screw 38 is rotatably mounted in the slide rod mounting brackets 32 and 33 between the slide rods 34 and 35. A ball nut 44 on screw 38 threadably engages the carriage and serves as a means of coupling the rotation of the feed screw 38 to the carriage 37.

A Wheatstone bridge type servosystem is employed accurately to position the magnetic head relative to the temperature announcing tracks on the magnetic drum. The magnetic head supporting carriage is mechanically connected to an electrical contact of a variable resistance. The variable resistance is connected in the branch of the bridge opposite the servomotor which controls the position of the magnetic head.

Advantageously, this servosystem may be of the type known as the Brown Electronik Continuous Balance System shown in Technical Bulletin No. B15–6A, Copyrighted 1956, by Minneapolis-Honeywell Regulator Co., Brown Instruments Division, Philadelphia, Pennsylvania. In this continuous balance system, a resistance bulb is connected in one arm of the Wheatstone bridge circuit and the balancing unit, including the servomotor, is connected in the diagonal arm of the Wheatstone bridge. The servomotor is mechanically connected to a contactor which controls the resistance of the branch opposite the resistance bulb.

In one illustrative embodiment of this invention, the controlled resistance is a potentiometer in the form of a pair of parallel-connected and parallel positioned resistance wires. Any variation in the resistance of the resistance bulb in response to changes in temperature will cause a current to flow through the balance unit and will be amplified and transmitted to the motor. The motor, in response to this E.M.F. drives the pair of contacts which engages the parallel-connected potentiometers of the calibrated E.M.F. until the system is rebalanced.

As shown in FIGURES 2 and 7, a motor 60 is mechanically mounted on the top of housing 1 and is electrically connected in the bridge circuit, not shown, and is also coupled by means of a clutch assembly 61, 63 and 65 to the feed screw 38. This clutch assembly is best seen in detail in FIGURE 7. As therein depicted a clutch-driven flange 65 has a plurality of clutch detent balls 63 mounted therein, which detent balls are spring-urged into engagement with clutch driving flange 61. Advantageously, the clutch driving flange is secured to the shaft of motor 60, while the clutch-driven flange is secured to the feed screw 38. Whenever it is desired to move the magnetic head-supporting carriage 37 lengthwise of the record drum 6, the clutch-driven flange 65 is manually rotated. Such rotation does not rotate the armature of motor 60 because the manual torque overcomes the springs of the clutch. Accordingly, the branch of the bridge circuit containing the stator circuit of motor 60 is not unbalanced. Thus, it is possible manually to unbalance one branch of the bridge circuit and thus quickly check the calibration of the servosystem merely by rotating the clutch driven flange 65 through a sufficient distance to unbalance the system. The servosystem then tends to rebalance itself by moving the potentiometer contact connected to the magnetic head supporting carriage, as will be subsequently explained. Similarly, this clutch provides a means by which the accuracy of rebalancing the servosystem may be checked. For example, if the servo circuit is operative, and the clutch-driven plate is rotated slightly to move the carriage in one direction and then released, the servosystem should actuate the motor 60, which rotates the feed screw in a direction to restore the carriage to its initial position.

In the specific illustrative embodiment depicted in the drawing, resistance wires 62, best seen in FIGURE 2, comprise that portion of the Wheatstone bridge of the servosystem which is in the branch of the bridge opposite the motor-containing branch. A pair of slides 64, shown in FIGURE 4, are connected to the magnetic head carriage by means of the right angle bracket 66, secured to carriage 37 by screws 37a, and move longitudinally of the wound resistances 62, as the carriage moves longitudinally of the axis of the magnetic drum 6.

For visually determining the temperature announced by the machine, an indicator pointer 68 is mounted on the carriage supported bracket 66 and indicates the announced temperature on temperature scale 70. Temperature scale 70 and the wound resistances 62 are secured to a suitable bracket 71 on main housing 1. The wound resistances are insulatingly mounted on the bracket 71 by means of an insulating block 73.

As best seen in FIGURES 2 and 3, a motor 75, which may advantageously be a synchronous motor, is connected to the record drum 6 by means of a suitable worm gear 77, best seen in FIGURE 3. Motor 75 may be a synchronous motor which will rotate at a speed such as 1800 r.p.m. and through worm gear 77 rotate the record shaft at a low rate, such as 12 r.p.m. The connection between worm gear 77 and the record shaft 3 is through compliance flywheel flutter filter constituted of felt bushing 79, drive pin 81, drive flange 83 and worm wheel 78, all shown in FIGURE 1.

Synchronous motor 75 may be connected to the same electrical source as the time announcing machine disclosed in Franklin Patent 2,285,425, issued June 9, 1942. When synchronized, the machine can announce the time and a commercial, followed by a temperature announcement from the machine in accordance with this invention.

Magnetic head supporting carriage 37, as seen in FIGURES 1-3, includes a base member or slide bushing 85 which has a portion 87 encircling the guide 35 and portion 88, which encircles guide rod 34. Mounted within carriage 37 and enclircling guide rod 34 is a lifter shaft bushing 90. A lifter shaft bushing retainer 92 is secured to this lifter shaft bushing 90 by suitable screws 94. A lifter sleeve 96 is held in position by lifter shaft bushing retainer 92 and this lifter sleeve has a key 98 secured on its inner surface. Advantageously, key 98 rides in a keyway 100 recessed in the guide and pivot rod 34. Key 98 imparts rotary motion to the lifter sleeve 96 in response to rotation of the pivot 34.

Actuation of the announcing machine is effected by moving the magnetic head into co-operation with the magnetic drum. Similarly, de-acutation is achieved by moving the magnetic head out of co-operation with the magnetic drum. The cam follower arm 102, best seen on the right-hand side of FIGURE 1 and in FIGURE 3, is secured to lifter shaft 34 and has secured to its opposite end a cam follower bearing stud 104 on which ball bearing cam follower 105 is mounted, which cam follower bearing engages cam plate 103. As previously mentioned, cam plate 103 is connected through the gears 9, 10 and 13 to the gear 3b on shaft 3 of the record drum. Cam surface 103 may have any desired configuration, depending on the period through which the magnetic head is to be held in operative engagement relative to the magnetic record supported on drum 6, as will be subsequently explained.

One example of the cam plate 103 is shown in FIGURE 5. The gear train 3c, 10 and 13 rotates the cam plate 103 at a speed of 6 r.p.m. or one revolution each 10 seconds. With this configuration and speed, lifter shaft 34 rotates 10½ degrees each 10 seconds, dwells approximately 2 seconds and returns to its original position. When shaft 34 rotates, lifter actuator 106 (FIGURE 4), which is threadably secured to lifter sleeve 96, rotates into engagement with the magnetic head arm carrier 26 for 8 seconds, and then rotates out of engagement with carrier 26 for 2 seconds.

If it is desired to increase the cycle time to produce greater message availability time on the synchronized time announcing machine, a different timing cam such as 103a, shown in FIGURE 6, may be employed. Cam 103a is, for the speed of rotation given, a 15-second cycle cam. If this change were made, it would be necessary to change the position of idler 10 to that indicated by 10a, shown in dotted line in FIGURE 3. The 15-second cam 103a would permit the magnetic head to be in contact with the record belt 6a for approximately 2 seconds and in a raised position approximately 13 seconds.

Since only a small circumferential portion of the record surface is employed (144° of rotation) to carry the 2-second temperature announcement diametrically opposite the first set of recordings, a second set may be recorded in a different voice. For example, male on the first set and female on the second. The record mounting flange 107 is provided with two locating holes 108 and 109, shown in FIGURE 1, located 180 degrees apart and the record mounting hub 4 is provided with a single locating pin 4a to engage one of the locating holes. Since the magnetic head remains in contact with the record for only 2 seconds of a 10 or 15-second cycle, the presence of the additional set of sound tracks displaced 180 degrees on the record drum does not effect the announcement cycle. If at any time it is desired to change the announcement from the female to the male voice or vice versa, this could easily be accomplished on the temperature machine simply by loosening the securing screws on the record drum 6, removing the record and rotating it 180 degrees and re-engaging the locating pin 4a in the opposite hole 108 or 109, as the case may be.

Advantageously, the lifter actuator 106 accurately positions the magnetic head arm carrier 110 to the exact servo balance point relative to the resistance wires 62 each time the magnetic head is rotated out of engagement with the record 6a. The lower end of actuator 106 has a ball bearing mounted thereon, which ball bearing mounting engages a notch 111 in the head arm carrier 110 accurately laterally to position the head arm carrier upon engagement of the lifter actuator 106 with carrier 110.

As best seen in FIGURES 1 and 2, a capsule bushing 112 is mounted in head carriage 37 and has two Thompson ball reciprocating bushings 114 therein. Advantageously, the head assembly mounting shaft is reciprocably positioned for limited axial movement in ball reciprocating bushing 114, secured in head carriage 37. Head arm mounting screw 116 threadably engages arm 118, which depends from head arm carrier 110. Magnetic head supporting arm 120 is rotatably mounted on screw 116 by means of bearings 122 and 124 and head mount retaining collar 126. Magnetic head 128 and head mount angle bracket 130 are secured to arm 120 by means of head pivot shaft 132. Advantageously, head 128 is secured to bracket 130 by means of a pair of screws 133. A tangent adjusting screw 135 threadably engages the cylindrical portion 136 of head mount arm 120. The arm portion 137 of bracket 130 is apertured to encircle screw 135 and holds a tangent adjustment spring 138 in compression against cylindrical portion 140. A tangent adjusting knob 142 has a threaded aperture to receive screw 135 and adjust the pressure applied to arm 137 of bracket 130 and thus control the angle of orientation of the magnetic head 128 relative to the shaft 132. Adjustment of the head 128 relative to shaft 132 controls the head orientation relative to the drum 6.

As best seen in FIGURE 2, the head mount arm 120 is rotatably mounted on head mount arm pivot shaft 116, which shaft threadably engages arm 141, which arm depends from head arm carrier 110. Advantageously, an arm 143 extends from head arm carrier 110 and extends parallel thereto to a point slightly beyond head 128. A pin 144 is secured at right angles to the end of arm 120 and extends to a point above the end of arm 143. When the lifter actuator engages and rotates head arm carrier 110, arm 143 rotates, rotating head mount arm 120 about shaft 116 by means of pin 144. When head 128 is lifted relative to drum 6, the announcing machine is de-actuated. When the head is lifted, it is accurately laterally positioned by the sliding movement of floating shaft 19 in response to the engagement of lifter actuator 106 and V-notch 111 on head arm carrier 110, as was previously explained. However, accurate positioning of head 128 to produce an electrical balance in the servosystem does not necessarily align the head with respect to the nearest temperature announcing track on the magnetic record 6a. Accordingly, it may be necessary to translate the magnetic head 128 a finite distance as it is moved into engagement with the magnetic drum 6a.

Translation of the magnetic head 128 accurately to position the head 128 relative to the nearer sound track on record 6a is accomplished by means of detent bar 145 mounted on slide rod mounting brackets 32 and 33 and a detent bearing mounting stud 110a secured to head arm carrier 110. Detent bar 145 is mounted in a vertical plane and has a series of V-shaped notches 146 on its lower edge. Advantageously, each V-shaped notch 146 is accurately aligned with one of the tracks on the record belt 6a secured to the drum 6. The width of each V-shaped notch 146 is equal to the distance between centers of adjacent tracks on the belt 6a. Advantageously, the detent bearing mounting stud 110a has mounted on its end a miniature ball bearing 147 (not shown) to minimize friction in dropping into the nearest V accurately to position the head 128 when the V-notch on bar 145 is engaged by the ball bearing 147. The detent bearing mounting stud 110a extends horizontally from head arm carrier 110 at a point where ball bearing 147 on stud 110a will engage the lower edge of detent bar 145 when the carrier 110 rotates downwardly into a position in which pin 52 on carrier 110 releases arm 120. Accordingly, the co-operation of detent bar 145 and bearing 147 on detent bearing stud 110a causes lateral displacement of the head arm carrier 110, secured to floating shaft 148, from a position indicative of an exact balance in the servosystem to a position in which the magnetic head 128 is accurately aligned with the nearer temperature track on belt 6a. In the operation of the bi-directional servosystem which is responsive to an aperiodic variable, such as temperature, the variable will often be of a value intermediate the values recorded on the successive record tracks on belt 6a. For example, the temperature may be 72¼ degrees. The co-operation of lifter actuator 106 and the V-notch in head arm carrier will position the magnetic head to a position corresponding to the exact balance of the servosystem or 72¼ degrees. As the lifter arm rotates away from head arm carrier 110, carrier 110 rotates into a position in which bearing 147 on detent bearing stud 110a engages the V-notch on detent bar 145 corresponding to the 72-degree track and displaces the magnetic head one-fourth the distance between adjacent tracks, causing the head to be in a position of co-operation with the 72-degree track. Occasionally, the temperature will be a half degree or one in which the magnetic head will be positioned mid-way between tracks. Such a temperature would require the upper edge bearing 147 on stud 110a to engage the lower edge or tip of one of the V-notches on bar 145. Such an engagement might result in balance of the stud 110a and bar 145 so that the head 128 would be held in a position of co-operation with the "guard track" and a portion of both adjacent tracks intermediate the record tracks such that no intelligible temperature will be announced.

To obviate any possibility of locking between said 110a and the peak between two V's in bar 145, null actuator pin 149 threadably mounted on lifter sleeve 96, is arranged to contact null actuator driven pin 150, mounted on an arm 152 extending upwardly from head arm carrier 110. When pins 149 and 150 come into engagement, head arm carrier 110 is driven laterally to cause the miniature ball bearing (not shown) on detent bearing stud 110a to align the V-groove in detent bar 145 corresponding to the next higher degree.

Advantageously, the temperature announcing machine includes a servo lockout mechanism which locks out the servo drive motor 60 during the announcing period. This structure makes it impossible for the servo system to change the announcement of temperature during the period in which the machine is actually announcing.

Conceivably, it is possible for a rapid temperature change to occur during the announcement cycle. If no lockout were provided, the servo system would actuate motor 60, rotating screw 38, thereby pulling the magnetic head 128 off of the track being announced, producing a garbled message.

The lockout operation is produced by the co-operation of detent spring 160, shown in FIGURE 9, which is secured to the end of slide rod 34 and a straight knurl 161 on clutch-driven flange 65. Slide rod 34 oscillates each cycle of cam 107 and moves the end 162 of spring 160 from the position shown in dotted line into engagement with the knurl 161, as shown in solid outline. In this position, spring 160 locks the clutch-driven flange 65, attached to the lead screw 38. If the servomotor 60 is actuated during this announcing period, the ball clutch 61–63 would permit the servomotor to rotate without rotating lead screw 38.

While I have shown and described various embodiments of my invention, it is understood that the principles thereof may be extended to many and varied types of machines and apparatus. The invention, therefore, is not to be limited to the details illustrated and described herein.

What is claimed is:

1. A system for announcing a bidirectional aperiodic physical variable comprising a servosystem continuously and bi-directionally operable in response to change in said aperiodic variable, an announcing machine operatively connected to said servosystem, said announcing system including a housing, a record drum rotatably mounted in said housing and adapted to receive a record thereon, said record having circumferential tracks recorded thereon, magnetic head means including a magnetic head positioned for co-operation with said record, carriage means supporting said head means, said last mentioned means including means reciprocably supporting said head means for movement along the axis of said drum relative to said carriage means, carriage drive means for controlling the movement of said carriage, means connecting said servosystem to said carriage means for translating said carriage means and said magnetic head means relative to said record drum to effect continuous translation of said magnetic head means to a position indicative of the instantaneous value of said aperiodic variable, said announcing machine further including means for moving said magnetic head into and out of engagement with a record on said record drum, said last mentioned means including means for independently and accurately positioning said magnetic head means relative to said carriage means to a position for coaction with the nearest circumferential track on said record, and means preventing translation of said magnetic head during engagement thereof with the record.

2. A system according to claim 1 wherein said means for independently and accurately positioning said magnetic head means includes detent bar means mounted on said housing and detent stud means connected to said magnetic head, said detent bar means and detent stud means co-operating to accurately position said magnetic head relative to one of the tracks on said record when said magnetic head is moving into a position of co-operation with said record.

3. A system according to claim 2 further including pin means for preventing the locking of the engagement between said detent bar means and said detent stud means in a position intermediate two of the record tracks.

4. A system according to claim 3 further including a servomotor operatively connected to said carriage means to drive said carriage means in either direction by infinitely small increments and clutch means connected between said servomotor and said carriage means to permit manual positioning of said carriage means by manual rotation of said clutch means.

5. A system according to claim 4 wherein said means for positioning said magnetic head means includes a head arm carrier connected to said magnetic head and wherein said means for moving said magnetic head into and out of engagement with said record includes a lifter actuator coupled to said record drum whereby said lifter actuator periodically engages said arm carrier to move said magnetic head out of engagement with said record and simultaneously accurately positions said magnetic head to said position for coaction with the nearest circumferential track on the record.

6. A machine for announcing an aperiodic bidirectional variable comprising a housing, a record drum rotatably mounted on said housing and having an outer periphery shaped to receive thereon a record belt having a plurality of tracks, frame means mounted on said housing, carriage means slidably mounted on said frame means for movement axially on said record drum, magnetic head supporting means reciprocably coupled to said carriage means and having a magnetic head thereon, said frame means including a lifter shaft having a lifter sleeve thereon, a lifter actuator secured to said lifter sleeve and means for periodically rotating said lifter shaft to bring said lifter actuator into engagement with said magnetic head supporting means whereby said head is moved out of engagement with the belt on said record drum, a servosystem continuously and bi-directionally operable in response to change in said aperiodic variable, means connecting said servosystem to said magnetic head supporting means to effect a continuous positioning of said magnetic head to a position indicative of the instantaneous value of said aperiodic variable, means operable independently of said last-named means for moving said magnetic head axially relative to said carriage means to a position corresponding to the position of co-operation with the nearer track on said record when said lifter actuator permits said magnetic head to move into engagement with said record, and means preventing translation of said magnetic head during engagement thereof with said record.

7. An announcing machine according to claim 6 further including a first pin secured to said magnetic head supporting means and a second pin connected to said lifter sleeve for contacting said first pin whenever said variable exhibits a value mid-way between the values defined on adjacent tracks of said record to move said magnetic head into engagement with one of said tracks thereby preventing locking between said means for accurately positioning said magnetic head relative to one of said tracks.

8. An announcing machine according to claim 6 further including a plurality of means on said drum for accurately indexing said record in any one of a plurality of positions, said drum having parallel tracks magnetized thereon around a fractional portion of its periphery whereby the record for any given axial spacing may be changed by rotating the record relative to said drum and indexing said record by said indexing means.

9. An announcing machine according to claim 6 wherein said means for periodically rotating said lifter shaft comprises cam means connected to said record drum whereby the periodic rotation of said lifter shaft is determined by the curvature of said cam means.

10. A machine according to claim 6 wherein said means for moving said magnetic head means comprises a servomotor and a clutch connecting said servomotor to said magnetic head and wherein said machine includes servo lockout means for rendering said clutch inoperable during the announcing period.

11. A machine according to claim 10 wherein said servo lockout means includes a detent spring mounted on the end of said lifter shaft and positioned to engage said clutch to render said clutch inoperable when said lifter shaft is rotated into a position to permit said head to engage said record.

12. An announcing machine according to claim 11 wherein said clutch includes a cylindrical member having detents in the periphery thereof, said detent spring moving into one of said detents when said lifter shaft is rotated.

References Cited by the Examiner
UNITED STATES PATENTS

| | | | |
|---|---|---|---|
| 2,435,066 | 1/48 | Barsh | 340—181 |
| 2,743,317 | 4/56 | Roberts | 179—100.2 |
| 2,745,054 | 5/56 | Legenberger | 340—187 |
| 2,756,057 | 7/56 | Parkinson | 179—6 |
| 2,782,041 | 2/57 | Muller | 179—100.2 X |
| 2,803,515 | 8/57 | Begun et al. | 346—74 |
| 2,831,180 | 4/58 | Hasbrouck | 179—100.2 |
| 2,832,841 | 4/58 | Eldridge | 179—100.2 |
| 2,880,279 | 3/59 | Nickerson | 179—6 |
| 3,009,759 | 11/61 | Johnson et al. | 346—74 |

IRVING L. SRAGOW, *Primary Examiner.*

ROBERT H. ROSE, ELI J. SAX, *Examiners.*